United States Patent
Khan et al.

(10) Patent No.: US 8,531,288 B1
(45) Date of Patent: Sep. 10, 2013

(54) SYSTEM AND METHOD FOR COLLABORATIVE RESOURCE TRACKING

(75) Inventors: Usman Khan, Somerville, MA (US); José M. Moura, Pittsburgh, PA (US); Soummya Kar, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 366 days.

(21) Appl. No.: 12/942,951

(22) Filed: Nov. 9, 2010

Related U.S. Application Data

(60) Provisional application No. 61/259,440, filed on Nov. 9, 2009.

(51) Int. Cl.
G08B 1/08 (2006.01)

(52) U.S. Cl.
USPC ............... 340/539.13; 340/10.1; 340/572.1

(58) Field of Classification Search
USPC ............ 340/539.13, 539.1, 568.1, 10.1, 10.4, 340/572.1
See application file for complete search history.

(56) References Cited

U.S. PATENT DOCUMENTS

| | | | |
|---|---|---|---|
| 6,659,947 B1 | 12/2003 | Carter et al. | |
| 6,859,831 B1 | 2/2005 | Gelvin et al. | |
| 7,246,746 B2 | 7/2007 | McNamara et al. | |
| 7,250,906 B2 | 7/2007 | Goren et al. | |
| 7,315,281 B2 | 1/2008 | Dejanovic et al. | |
| 7,333,018 B2 | 2/2008 | Singh et al. | |
| 7,373,154 B2 | 5/2008 | Sharony et al. | |
| 7,411,921 B2 | 8/2008 | Strong et al. | |
| 7,477,163 B2 | 1/2009 | Chen et al. | |
| 7,839,289 B2 * | 11/2010 | Chung et al. | 340/572.8 |
| 8,174,383 B1 * | 5/2012 | Chung et al. | 340/572.1 |
| 2005/0258240 A1 * | 11/2005 | Chappidi et al. | 235/385 |
| 2005/0281320 A1 | 12/2005 | Neugebauer | |
| 2006/0012480 A1 | 1/2006 | Klowak | |
| 2006/0171538 A1 | 8/2006 | Larson et al. | |
| 2006/0184376 A1 | 8/2006 | Graves et al. | |
| 2007/0239324 A1 * | 10/2007 | Ehrman et al. | 701/2 |
| 2008/0204322 A1 * | 8/2008 | Oswald et al. | 342/465 |
| 2010/0289644 A1 * | 11/2010 | Slavin et al. | 340/568.1 |
| 2011/0080264 A1 * | 4/2011 | Clare et al. | 340/10.1 |

OTHER PUBLICATIONS

Moses, et. al., "A Self-localization method for wireless sensor networks", EURASIP Journal on Applied Signal Processing, No. 4, pp. 348-358, Mar. 2003.

Patwari, et. al., "Relative Location Estimation in Wireless Sensor Networks," IEEE Transactions in Signal Processing, vol. 51, No. 8, pp. 2137-2148, Aug. 2003.

(Continued)

*Primary Examiner* — John A Tweel, Jr.
(74) *Attorney, Agent, or Firm* — K&L Gates LLP

(57) ABSTRACT

A system and method for locating, tracking, and monitoring resource in large-scale facilities is disclosed herein. The system is based on a sensor network and is efficient, scalable, and requires only short-range communication. The system allows for sensor-to-sensor communication as well as the traditional sensor-to-anchor communication to effectively eliminate long-range communications. In order to perform resource localization and tracking, the present invention pairs each resource with an inexpensive, low-powered sensor possessing minimal resources or anchors and those resources communicate with their nearby resources or anchors until a wireless, linked network of resources and anchors is formed.

16 Claims, 7 Drawing Sheets

(56) References Cited

OTHER PUBLICATIONS

Shang, et. al., "Localization from mere connectivity", 4th ACM international symposium on mobile ad-hoc networking and computing, Annapolis, MD, Jun. 2003, pp. 201-212.

Shang, et. al., "Improved MDS-based localization," in IEEE Infocom, Hong Kong, Mar. 2004, pp. 2640-2651.

Thomas, et. al., "Revisiting trilateration for robot localization," IEEE Transactions on Robotics, vol. 21, No. 1, pp. 93-101, Feb. 2005.

Cao, et. al., "Localization with imprecise distance information in sensor networks," in the 44th IEEE Conference on Decision and Control and European Control Conference 2005.

Roweis, et. al., "Nonlinear dimensionality reduction by local linear embedding," Science, vol. 290, pp. 2323-2326, Dec. 2000.

Patwari, et. al., Manifold learning algorithms for localization in wireless sensor networks, in 29th IEEE International Conference on Acoustics . . . Mar. 2004, v. 3, pp. 857-860.

Niculescu, et. al., "Ad-hoc positioning system (aps)," in IEEE Globecom, San Antonio, TX, Apr. 2001, pp. 2926-2931.

Savvides, et. al., "The bits and flops of the N-hop multilateration primitive for node localization probs," in Intl. Wkshp. on Sensor Ntwrks and Apps, Sep. 2002, pp. 112-121.

Savvides, et. al., "Dynamic fine-grained localization in ad-hoc networks of sensors," in IEEE Mobicom, Rome, Italy, Jul. 2001, pp. 166-179.

Nagpal, et. al., "Organizing a global coordinate system from local information on an ad-hoc sensor network," in 2nd Intl. Wkshp on Info Processing . . . Apr. 2003, pp. 333-348.

\* cited by examiner

SYSTEM AND METHOD FOR COLLABORATIVE RESOURCE TRACKING

CROSS-REFERENCE TO RELATED APPLICATIONS

This application claims priority to U.S. Provisional Application Ser. No. 61/259,440, filed on Nov. 9, 2009 and entitled "Collaborative Tracking in Cluttered Indoor Environments." Priority to this prior application is expressly claimed and the disclosures are hereby incorporated by reference in their entireties.

STATEMENT REGARDING FEDERALLY-SPONSORED RESEARCH AND DEVELOPMENT

This invention was made with partial government support under the National Science Foundation (CRS 0428404). The government has certain rights in this invention.

FIELD OF THE INVENTION

The present invention is directed towards a system and method for locating, tracking, and monitoring objects in large-scale environments. More specifically, the present invention is directed towards a collaborative wireless tracking system using a network approach.

BACKGROUND OF THE INVENTION

Companies that run large-scale facilities such as warehouses or hospitals are interested in tracking their mobile assets in order to both maximize utilization and minimize theft. Other businesses, such as parking facilities and package distribution centers, also have the need to monitor, track, or find certain cars or packages within the confines of their respective infrastructures. Additionally, in many industries, there are also self-directed, robotic machines that move about in an industrial or hospital setting on a predetermined path and it could be useful to monitor and track these machines as well.

Specific to the hospital setting, for example, these mobile assets can include wheel chairs, mobile beds, IV pumps, and stretchers, etc. Interestingly, knowing the location of these items in a hospital can often also mean knowing the location of the patient, which can have significant value to the hospital administration and patient flow management personnel, while ensuring efficient operation and planning within a hospital.

Currently, it is known, as is discussed in U.S. Pat. No. 7,626,488, that the location of an organization's assets can be tracked using Radio Frequency Identification (RFID) tags. RFID tags are electronic devices that are comprised of a transponder and an integrated circuit programmed with unique identification information. These RFID tags are designed to communicate with tag readers, and, generally, have no internal power source, thus, relying on an external source to supply power. An RFID device with internal power is generally more expensive and bulkier than RFID devices without internal power. Additionally, a disadvantage of the RFID tracking is that as more devices are tracked, the less effective the tracking of the devices becomes, and the more complex and expensive it is to maintain the system. This is because a large amount of communication is required from the RFID tags to the readers, resulting in possible network bottlenecks, and because a large computational overhead is exerted on the center collecting these measurements. Moreover, the number of such centralized data collectors or stations does not scale with the number of tags.

The use of global positioning systems (GPS) to track objects is also well known and used everyday in the automotive and mobile phone industries, among others. GPS devices, however, are not preferred for indoor tracking due to the lack of line-of-sight communication with the satellites. Furthermore, GPS devices are not preferred in an indoor environment because they are relatively expensive and only accurate within several square yards, whereas, in an environment like a hospital or a nursing home, the tracking devices need to be accurate to a few feet.

Another commonly known communication system that can be used for monitoring and tracking is the wireless network. Often such a network is used in conjunction with RFID tags that are attached to the equipment to be monitored. Wireless transponders are used to collect sufficient information from the RFID tags and employ the received signal strength indicator (RSSI) and/or the time of arrival (ToA) information in order to triangulate the coordinates of a particular asset being tracked.

The key challenges in locating/tracking solutions for wireless indoor settings include: (i) the accuracy of distance estimates between sensors and anchors; (ii) the number of anchors (access points) required to guarantee certain accuracy; and (iii) the battery requirements of the sensors. In existing methodologies, the locating/tracking solutions do not employ sensor-to-sensor communication, but rely on sensor-to-anchor(s) communication. Due to this sensor-to-anchor(s) communication, the distance estimate(s) between sensor and anchor(s) is poor when the anchors are far away. Since all of the existing solutions in the field leverage sensor-to-anchor(s) communication, either the accuracy is poor due to heavy noise conditions when the number of anchors (access points) is small, or a large number of anchors (typically 5% of the objects or one at each room/zone to guarantee room/zone level accuracy) is required so that each sensor can find a reasonable number of anchors close-by. Furthermore, higher power is required to communicate with far-away anchors, and, to reduce this power, more anchors are required such that each sensor can find a reasonable number of anchors close-by.

What is needed is a system for tracking, monitoring, and locating mobile assets in a large-scale indoor facility, with low power requirements, that can handle a large number of mobile assets without the additional investment of adding anchors or related infrastructure, and can robustly handle communication imperfections (data loss, packet drops, interference, and multipath) within the system, while also providing acceptable accuracy and performance. The present invention improves upon the prior art in that the present invention locates and tracks objects accurately in an indoor environment using a very few number of anchors. The anchors are the devices that are fixed and have known exact locations. In the present invention, each asset is equipped with a sensing/computing device (herein referred to as a sensor) that is able to perform small computations and communicate over short distances ensuring minimal power requirements. The communication is required only with the sensors (assets) in a small neighborhood, thus reducing the high power required to communicate to the (possibly) far-away anchors, while also minimizing the communication bottlenecks, thereby reducing the need for the extra weight and additional maintenance needed for larger batteries. The present invention is robust to erroneous distance measurements, inter-sensor communication noise, and random data packet dropouts. Finally, the number of anchors needed for the system to work remains static no matter how many devices are being located.

SUMMARY OF THE INVENTION

The system and method of collaborative mobile asset tracking of the present invention aims to address the disadvantages of the prior art in that this system and method are able to track a plurality of resources in a cluttered indoor environment by exploiting the local structure of a wireless ad-hoc network formed by sensor-to-sensor and very few sensor-to-anchor communication links.

By allowing sensors to communicate directly with each other, the present invention has an advantage over prior art in that fewer anchors are needed, less powerful transmitters are used, and the present invention does not require: (i) expensive GPS units embedded in the equipment, (ii) extensive WiFi infrastructure, and (iii) long-distance communication between sensors and anchors.

The present invention views anchors and sensors as a network of interacting agents. Each agent only communicates with its neighbors, and with the structure of this network, low-complexity message-passing algorithms can be used for efficient and optimal information flow from the anchors to the sensors and back again.

More particularly, the system and method of the present invention proposes sensor-to-sensor communication as opposed to the prior art systems and methods of sensor-to-anchor communication. This resulting network of sensors and anchors allows for locating, tracking, and monitoring of resources in a completely distributed, scalable, and efficient manner. Furthermore, the present invention solves the problem of locating and tracking in environments subject to multipath, interference, communication noise, and imperfect distance measurements as a result of the sensor-to-sensor communication.

It is also an object of the present invention to provide a method for monitoring the location of one or a plurality of mobile assets by deploying a plurality of anchors having a known location and being configured to transmit and receive data wirelessly; disposing a sensor on each mobile asset to be tracked; said sensors being configured to transmit and receive data wirelessly; exchanging location data between each sensor and one or both of nearby sensors and anchors; determining an appropriate set of one or both of nearby sensors or anchors to ensure the location data is sufficient and reliable; and calculating a location estimate of the mobile asset based on the location data received from the appropriate set.

The descriptions provided herein are exemplary and explanatory and are intended to provide examples of embodiments of the claimed invention.

BRIEF DESCRIPTION OF THE SEVERAL VIEWS OF THE DRAWINGS

The present invention will now be described with reference to the following drawings of illustrative embodiments of the invention:

FIGS. 3a and 3b are a pair of diagrams illustrating the manner in which agents choose which of their neighbors to communicate with.

DETAILED DESCRIPTION OF THE INVENTION

In the following description, several numerous specific details are set forth in order to provide a thorough understanding of the present invention. It will be apparent to one skilled in the art that the scope of the present invention is not limited to the employment of these specific details. Other materials or methods that have not been described in detail can be used to practice the present invention.

The present invention relates to locating, tracking, and monitoring essential equipment using inexpensive, low power sensors and short-range communication between the sensors to determine the equipment's position. It is expected that facilities such as hospitals, where it is desirable to track a large number of resources simultaneously and in real-time, will benefit from the disclosed system and method. The present invention enables the user to embed each piece of equipment to be tracked with a relatively inexpensive and low-power sensor. For example, the hospital could attach these sensors to wheel chairs, stretchers, and/or mobile beds. As these sensors are able to communicate over short distances, all of the wheel chairs, stretchers, and mobile beds that have the sensor will be able to communicate with their neighboring wheel chairs, stretchers, or mobile beds.

Figure 1:
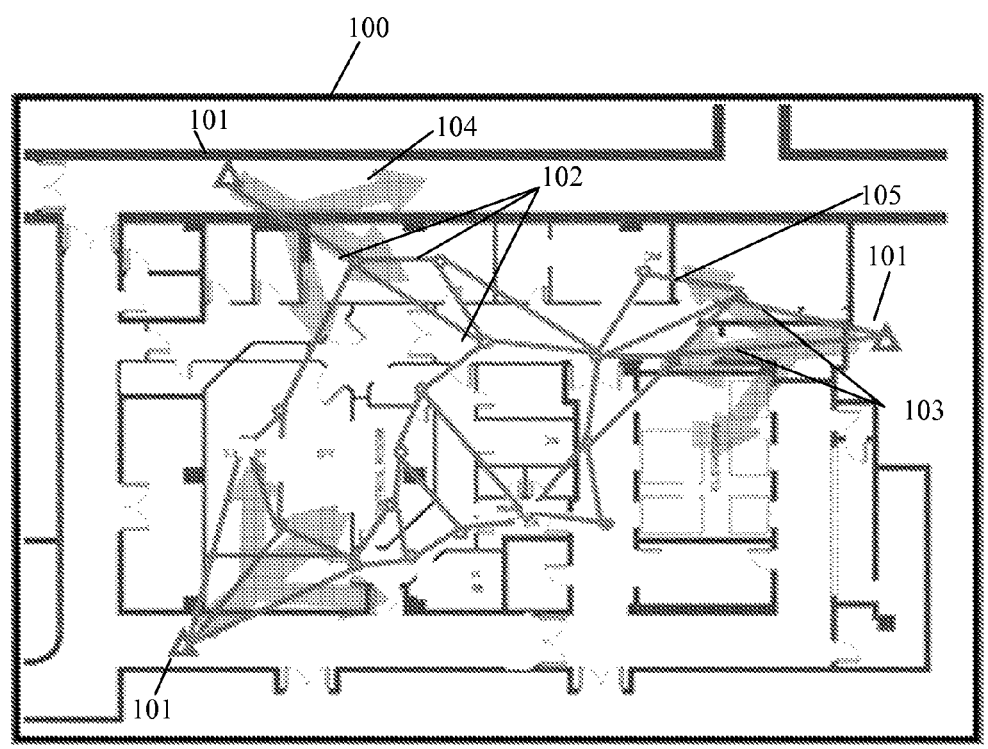
FIG. 1 is an illustration of a hospital floor that implements the invention's technology.

FIG. 1 is a graphical illustration as to how a sample hospital floor 100 with connected smart devices of the present invention works. As this is a two-dimensional example, only three anchors 101 are needed because according to the present invention, that is all that is needed for a two-dimensional space. In the case of a three dimensional space, only four anchors would be needed. The term "anchor," as used herein, refers to an immobile, fixed sensor having a known position.

Each anchor 101 has the capability to emit a short-range signal 104 whereby it can communicate 103 with nearby mobile assets that are also equipped with a sensor of the present invention. A mobile asset equipped with a sensor of the present invention is hereafter referred to as an "agent" 102. Each sensor 102 is equipped with a sensing mechanism to measure and monitor ambient conditions such as temperature, light, and motion. Each sensor also has a two-way communication module, a small memory storage capacity, and one or a plurality of microprocessors capable of performing simple computations like addition and multiplication. In a preferred embodiment, the sensor of the present invention uses the FireFly Sensor Networking Platform, which is a low-cost low-power hardware platform for wireless sensor networking The main Firefly board uses an Atmel ATmega1281 8-bit micro-controller with 8 KB of RAM and 128 KB of ROM along with Chipcon's CC2420 IEEE 802.15.4 standard-compliant radio transceiver for communication. The maximum packet size supported by 802.15.4 is 128 bytes and the maximum raw data rate is 250 Kbps. The FireFly platform supports an SDIO port that can be used for large FLASH storage or as a universal interface to PC compatible peripherals.

Utilizing these sensors, the agents 102 are also able to communicate 105 with other agents 102 that are nearby. Since each agent 102 is able to exchange data with nearby agents 102 or nearby anchors 101, the resulting sensor data that is collected at each agent permits each agent 102 to iteratively calculate its exact location. This result is made possible by the computation mechanism in each sensor that runs this invention's localization algorithm. This results in a system that does not require a large number of anchors nor long-distance communication. Furthermore, this system does not require a central processor for computational purposes, but only for the purpose of querying and collecting location information from the agents when such information is requested by a user.

In a preferred embodiment, the communication within this network of agents and anchors may be implemented using a B-MAC protocol over the RF technology as would be known to persons skilled in the art. Using a transceiver that is built into each sensor, each agent 102 is able to communicate with other nearby agents 102 or nearby anchors 101. Because this communication occurs wirelessly, it can be noisy and subject to random data packet drops, multi-path fading effects, and interference. The agents send and receive data such as received signal strength (RSS), time of arrival (TOA), or other methods to estimate the distances between the devices, all of which can also be noisy. However, the degradation in quality of data remains low due to the fact that the inter-sensor distances are relatively small in most cases and the iterative nature of the localization algorithm minimizes (and averages out) the effects caused by poor data quality and wireless imperfections.

Figure 2:
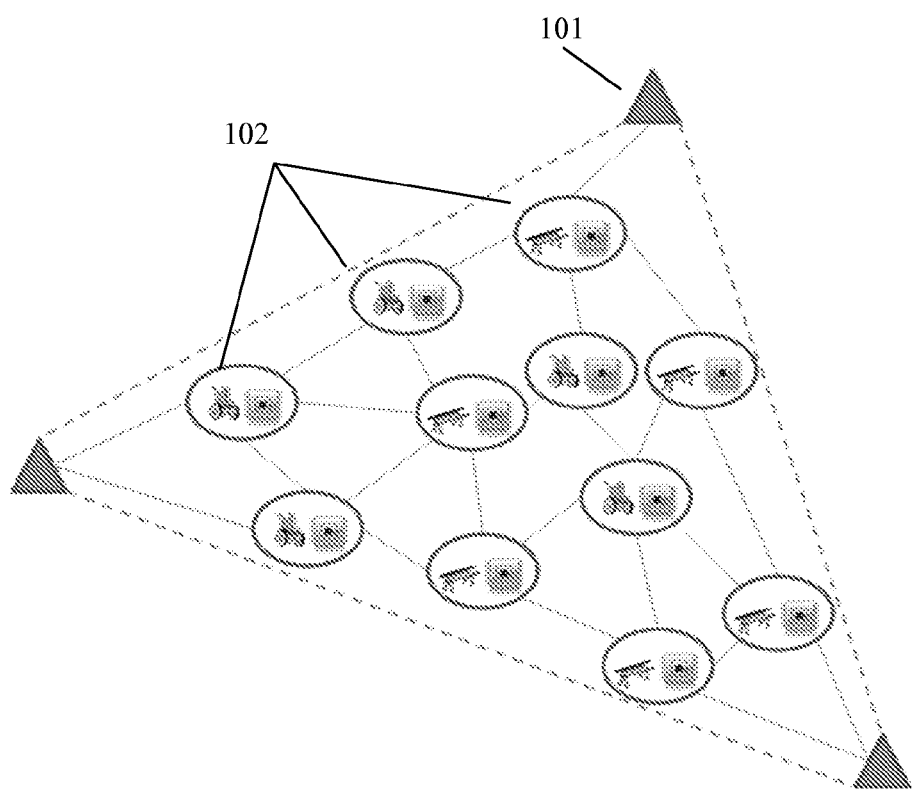
FIG. 2 illustrates the structure of the network, where each sensor communicates only to near-by agents or anchors.

FIG. 2 is a graphical illustration of a number of agents 102 in communication with other nearby agents 102 and anchors 101 according to the system of the present invention. In FIG. 2, as it is a two-dimensional space, three anchors 101 are needed; however, in a three-dimensional space, an additional anchor will be needed. These anchors 101 are able to encapsulate the majority of the region of interest and the rest of the network finds its location in the frame of reference provided by these anchors 101. The agents 102 are usually mobile, making the neighborhood dynamic, which means that FIG. 2 is just a snapshot of the network at a given time.

It is notable that the present invention requires no centralized collection point where each sensor has to send its measurements for computational purposes; however, the use of a central station will be needed to query the appropriate agents in order to obtain their location estimates. Moreover, all inter-sensor communication occurs over very short distances. Because of this, the communication stream suffers less degradation and bottlenecks and less battery power is required.

The system of the present invention also minimizes the number of anchors needed and is scalable without the need to add additional anchors, which is an advantage over prior art due, at least, to the lower cost of implementation and the simplicity of the infrastructure design. All that is required is that the sensors lie inside the convex hull (triangle in 2d, and pyramid in 3d) formed by the anchors. This is also shown in FIG. 1, FIG. 2, FIG. 3, and FIG. 5, where the sensors (with unknown locations) lie inside the triangle formed by the anchors (with known locations). Furthermore, this requirement precisely formulates where to install the anchors. It is noteworthy that this requirement of anchor placement does not limit the functionality of this invention in any practical setting, as in any such setting, suitable anchor locations can be found such that the anchors cover the region of interest. As the agents continue to interact over time, they continually update their location estimates, which ultimately converge to the true location of the corresponding mobile assets, regardless of noise or lost data. This convergence to the true locations of the mobile assets is precise and the eventual result is based on a stochastic approximation method applied to the localization algorithm followed by appropriate distance estimation at each iteration. We now describe the localization algorithm that is employed by this invention.

The Localization Algorithm

Figure 3A:
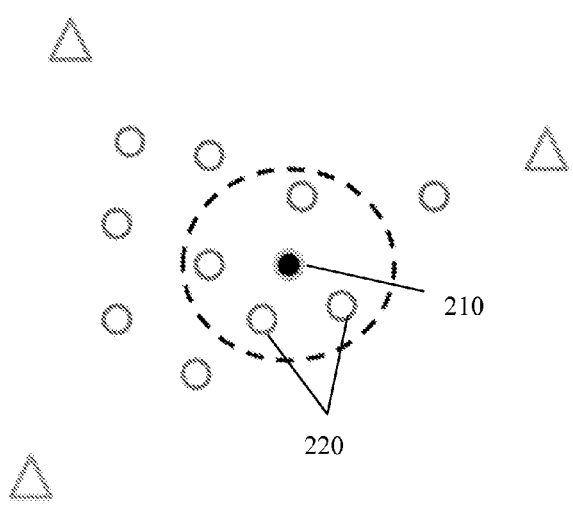
Figure 3B:
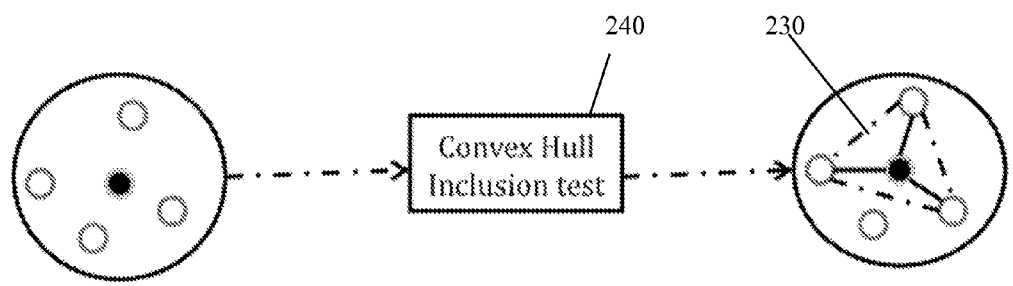
Figure 4:
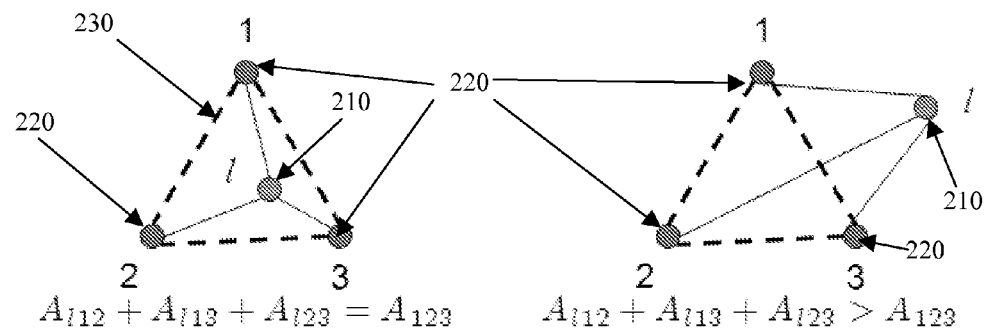
FIG. 4 is a diagram that illustrates the use of the convex hull inclusion test.

With reference, now, to FIGS. 3*a*, 3*b* and 4, to determine the location of the sensor, the present invention employs a locating/tracking algorithm that has two phases. Phase one is the set-up phase, where each agent 210 uses the sensor attached to it to identify a plurality of local agents 220 nearby. Each sensor then chooses a subset of sensors such that the sensor 210 in question lies inside the convex hull 230 (triangle) of the identified local agents 220 within this subset. This subset is herein referred to as a triangulation set at a particular sensor. The sensor locally performs a convex hull inclusion test 240 to identify whether the agent 210 lies in the convex hull 230 (triangle in 2D or pyramid in 3D) of the local agents 220 chosen from its neighbors.

FIG. 4 provides an explanation of the convex hull inclusion test 240. An agent 210 lies in the convex hull 230 of the three local agents 220, the sum of the areas of the three triangles with vertices 112, 123, 113, equals the area of the triangle with vertices 123. If the sum of the areas of the three triangles does not equal the area of the triangle, then the sensor must lie outside the convex hull 230 and the location of that particular agent cannot reliably be determined with the chosen agents using this invention's localization algorithm. In such cases, the communication radius at the sensor is increased in small steps in order to find one such triangulation set. The convex hull inclusion test described here uses the well-known Cayley-Menger determinants to compute the required areas using only the inter-sensor distances. As only inter-sensor distances are used, this test further adds to the novelty of this invention, as such a test has not been proposed in any prior art.

Phase two of the localization algorithm is the 'interact phase.' In the interact phase, the sensor attached to each agent 210 successively interacts with the local agents 220 in its triangulation set to update its location estimate as a function of the location estimates at these nearby agents. The agent's location is updated by a linear function where the coefficients of the linear combination are chosen to be the barycentric coordinates. Intuitively, the barycentric coordinates of an agent may be viewed as its geographical coordinates in the reference frame of its neighboring agents. This change of reference frame (transformation of the Euclidean coordinates to the barycentric) is a novel aspect to our solution. Essentially, it reduces a complicated non-linear problem to a linear problem with guaranteed convergence to the true physical locations.

The use of the barycentric coordinates is novel to this invention and has not been used in an iterative localization setting before. The interact phase ends when a desired accuracy is met in the position of the sensors. The desired accuracy is set at the application level. For instance, a wheel-chair location may be acceptable with one to two meter accuracy; whereas, an IV pump may require an accuracy of two to three feet instead.

Assuming that the underlying network of sensors is connected, possibly via multiple hops from one sensor to another, the information from the anchors propagates to every sensor in the network through multi-hop communication links. This is because each interact phase ensures the information from the anchors moves in the network, as shown in FIG. 1. This procedure enables each sensor to learn its location only as a function of nearby agents, hence keeping the number of anchors fixed no matter how many agents are added to the system. Over these interactions, the location information is fused using statistically optimal principles such as the well-known recursive algorithms (of Robbins-Monroe type)

adapted to the localization problem. In this recursive algorithm, each sensor iteratively updates its location estimate as a function of only its single-hop neighbors. Using the theory of stochastic approximation and recursive algorithms, these location estimates converge to the physical location of the sensor.

Figure 5:
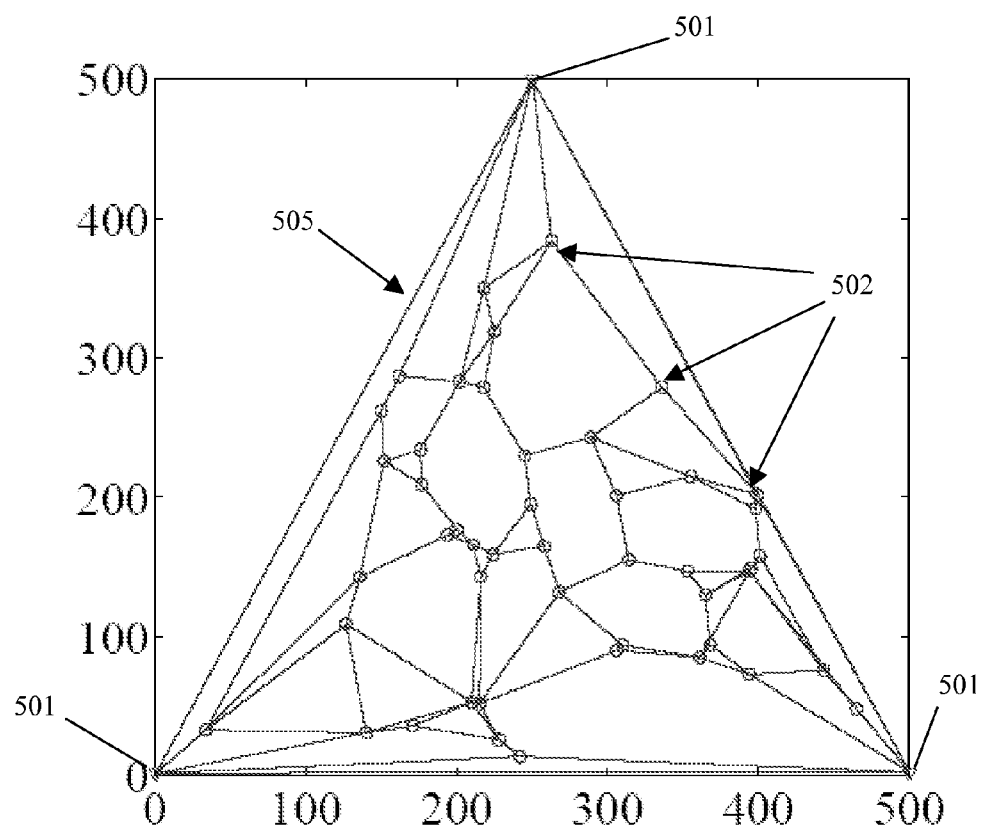
FIG. 5 illustrates a randomly deployed fifty agent connected network with three anchors.

FIG. 5 shows a randomly deployed fifty agent network of mobile assets. Of note, there are only three anchors 501 required. The fixed position of these anchors 501 is known by the system; however, the mobile assets or agents 502 are shown as circles and the system does not know their locations. The lines between the nodes (sensors and anchors) 501, 502 represents the wireless communication links. As FIG. 5 indicates, each agent 502 is communicating only with nearby agents over short-distance. The overall network lies within the convex hull 505 defined by the anchors 501. Other agents 502 share this information with nearby agents. This procedure is iterative, and after a short time, the cumulative location information is propagated from the anchors 501 to the agents 502 as shown in FIG. 1.

The present invention solves the localization problem in a network with a very noisy environment. The system of the present invention uses additive noise (independent of the noise distribution) with high variance to model multi-path and interference. Multipath is the wireless phenomenon where a signal can reach the receiver from multiple paths. Interference, as used herein, is the situation in which a signal may reach the receiver in a distorted manner due to interference from other wireless signals. This invention's network is random, i.e., each communication link can fail with non-zero probability. The distance measurements over the communication links are modeled using both RSS and TOA measurements. The measurements include realistic noise because of imperfect measurements.

Figure 6:
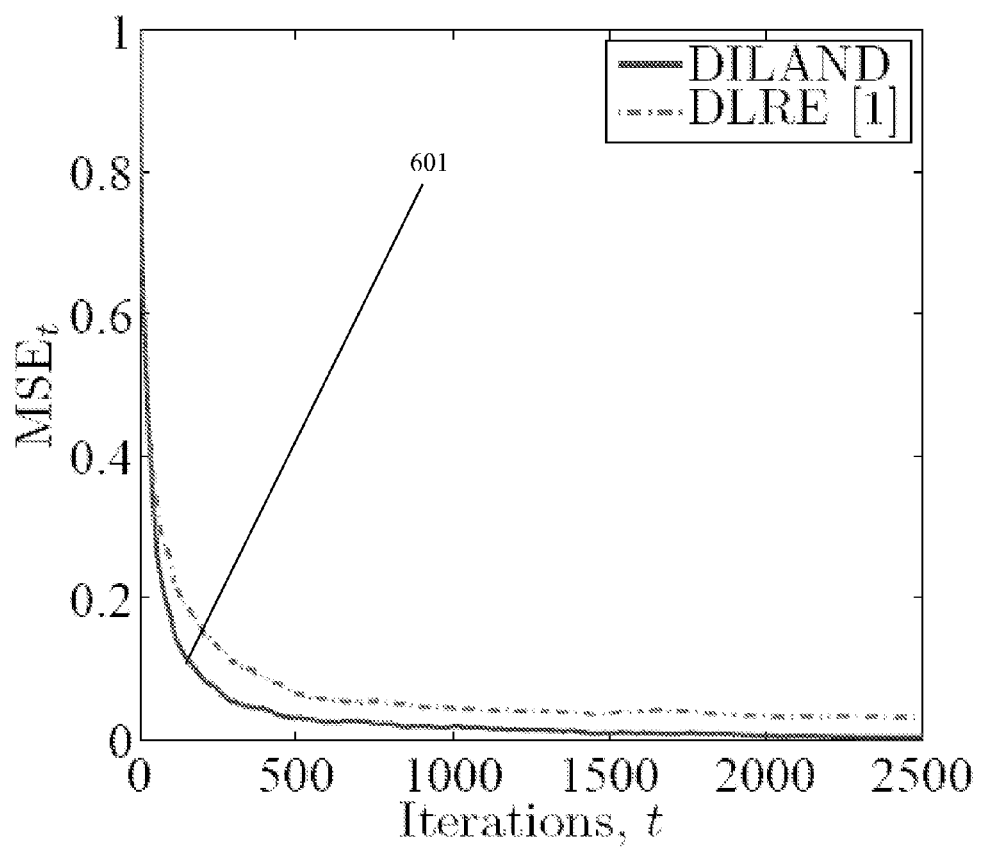
FIG. 6 is a diagram illustrating the convergence to true locations in the presence of noise.

The present invention uses a stochastic approximation based algorithm. Stochastic approximation is a theory that permits analysis of iterative algorithms that have perturbed by noise and uncertainties. The convergence to true locations in the presence of this noise is shown in FIG. 6. FIG. 6 shows the error 601 in the location estimates summed and scaled over the entire network when each object starts with a random guess of its location. The horizontal axis is the number of iterations (information exchanges among the numbers), whereas, the vertical axis is the mean squared error in the location estimates of the sensors. The error in the estimates goes to zero as the number of iterations increase. The larger number of iterations is due to the extreme noise conditions we used in our experiment. The horizontal axis is the number of messages exchanged over time. Within the first 500 messages between sensors, each object has a very reasonable estimate of its true location (near zero error). If more messages can be exchanged, the location estimates become near-perfect.

The system of the present invention, in accordance with at least one presently preferred embodiment, includes a wireless tracking system. The key characteristics and requirements of the system are: (a) it requires at least 4 anchors in 3-dimensional space to localize an arbitrary number of resources; (b) it only requires local communication among the resources; (c) the processing required at each resource is to compute a linear combination (additions and multiplication) of information from the nearby resources; (d) each resource estimates its distance from a few neighboring resources; (e) the algorithm converges to exact resource locations (with probability of 1) even in the presence of noisy inter-resource communication, random data packet dropouts, and noisy inter-resource distance measurements; and (f) the approach is applicable to track mobile resources.

The wireless tracking system of the present invention may be implemented on at least one general-purpose computer running suitable software programs. This system may also be implemented on at least one Integrated Circuit or part of at least one Integrated Circuit. Thus, this invention may be implemented in hardware, software, or a combination of both.

Figure 7:
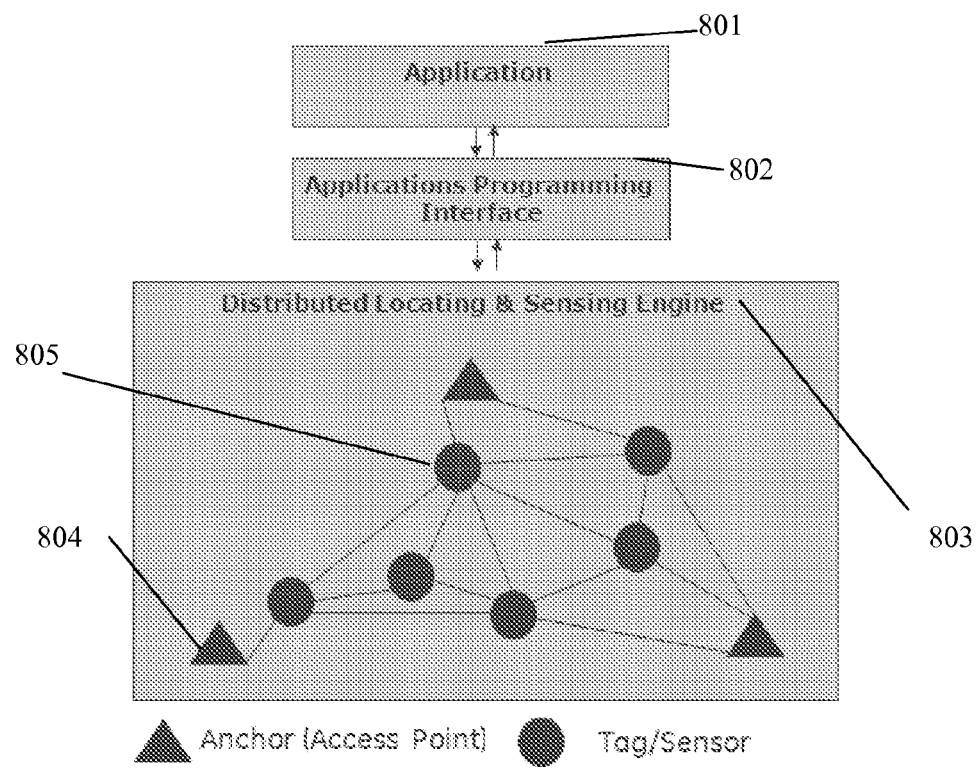
FIG. 7 is a flow chart illustrating the complete real time locating system.

FIG. 7 is a flow chart demonstrating the method of the present invention implemented with a computer application. The application 801 communicates through the application's programming interface 802. The application's programming interface communicates with the locating and sensing engine 803, which receives its information about the system from the anchors 804. The anchors 804 transmit the data that they have received from the sensors 805.

The arrangements for realizing the above-described functions in accordance with the present invention can be formed as software or software modules written using a computer-readable programming language. They are not necessarily formed as function blocks shown in FIG. 7.

In an alternative embodiment of the system, the system of the present invention is used as an embedded real-time application. The present invention uses the Carnegie Mellon University Firefly v2.2 sensors running the NanoRK real-time embedded operating system for this implementation. The sensor network corresponds to localizing the sensors in a cluttered lab environment emulating all the real-life constraints to be encountered in a practical setting. The inter-sensor communication uses a power efficient, broadcast-based B-MAC radio access protocol, where each sensor enters a sleep mode after an event of interest, including, but not limited to a communication or computation, and is triggered only by the occurrence of an event of interest. This leads to significant energy savings over the network and is the key in increasing node longevity/battery life, a matter of concern for any real-time sensor network implementation. The goal of this embodiment is to evolve the protocol and fit a full implementation of an RTLS (Real Time Location System) with optimal usage of the scarce computing, communication, and energy available to each sensor node, while allowing for a "high-level application layer" at the same time.

In another alternative embodiment, the system of the present invention is developed for localization, real-time monitoring and tracking of equipment and/or resources in a large facility including, but not limited to a package shipment facility. In the context of this embodiment, the package shipment facility, the following description will elaborate the techniques of the present invention.

In a large packaging facility, there is great interest in locating, tracking, and monitoring packages as they make their way through the facility. As each package enters the facility, an inexpensive sensor as has been previously described is attached that turns the package into a smart device. This "smart package" is able to communicate with nearby "smart equipment." Just like in the hospital example above, the smart packages are able to continually communicate with agents and be able to determine their position and communicate it to the system so that personnel at the tracking facility know the exact locations of packages at a given moment. Before the packages leave the facility, the sensor can be removed and reused on new incoming packages such that the process is repeated and packages are able to be tracking inside the facility at all times.

While in accordance with the patent statutes the presently preferred and various alternative embodiments of the present invention have been described in detail above, it should be understood that various other modifications and alternatives can be envisioned by those persons skilled in the art without departing from either the spirit of the invention or the scope of the appended claims.

We claim:

1. An efficient, low power, scalable system for monitoring one or a plurality of mobile assets within a predetermined area, the system comprising:
   a plurality of anchors having known, fixed locations; said anchors configured to transmit and receive data wirelessly;
   at least one sensor to be located or tracked; each of said sensors coupled with a mobile asset and configured to exchange location data with sensors or anchors located nearby; whereby each sensor determines its location relative to nearby sensors; and
   a monitoring processor configured to obtain location information from the sensors in response to a query made by a user.

2. The system of claim 1, wherein the number of anchors is one greater than the number of physical dimensions being monitored regardless of the number of sensors.

3. The system of claim 1, wherein the sensors comprise a transceiver, a sensing mechanism, a small memory storage capacity, one or a plurality of microprocessors and a power source.

4. The system of claim 3, further comprising a localization algorithm stored on the memory storage capacity to be executed by the one or a plurality of microprocessors.

5. The system of claim 1, wherein the location data comprises received signal strength or time of arrival data.

6. The system of claim 1, wherein the nearby sensors are comprised of sensors or anchors in a convex hull.

7. The system of claim 6, wherein the location information comprises measurements of the sensor's distance from its nearby sensors or anchors.

8. The system of claim 7, wherein the monitoring processor uses the location information received from the sensors, compares it to known anchor location information, and calculates the location of any mobile asset within the predetermined area.

9. A method for monitoring the location of one or a plurality of mobile assets, the method comprising:
   deploying a plurality of anchors, said anchors having a known location and being configured to transmit and receive data wirelessly;
   disposing a sensor on each mobile asset to be tracked; said sensors being configured to transmit and receive data wirelessly;
   exchanging location data between each sensor and one or both of nearby sensors and anchors;
   determining an appropriate set of one or both of nearby sensors or anchors to ensure the location data is sufficient and reliable; and
   calculating a location estimate of the mobile asset based on the location data received from the appropriate set.

10. The method set forth in claim 9, wherein determining an appropriate set of nearby sensors or anchors is further comprised of applying a convex hull inclusion test to the location data relating to one or both of nearby sensors or anchors.

11. The method set forth in claim 10, further comprising gradually increasing power to the transceiver in the event insufficient sensors or anchors are detected to satisfy the convex hull inclusion test.

12. The method set forth in claim 9, further comprising repeatedly exchanging location data with each sensor or anchor in the appropriate set until a comparison of location data for each sensor or anchor is sufficiently reliable.

13. The method set forth in claim 9, further comprising the steps of collecting the location estimates, combining them with anchor locations to monitor the location of any mobile asset.

14. The method set forth in claim 9, wherein each location estimate is calculated as a linear function of the location estimates at the appropriate set of nearby sensors or anchors.

15. The method set forth in claim 14, wherein coefficients of the linear function at each sensor are barycentric coordinates of the sensor or anchor expressed in terms of the appropriate set of nearby sensors or anchors.

16. The method set forth in claim 9, wherein each sensor locates a new set of nearby sensors or anchors if the mobile asset has moved or a nearby sensor has moved.

* * * * *